Dec. 16, 1969  H. E. TURREL  3,483,815
FOOD FRYER
Filed May 13, 1968  2 Sheets-Sheet 1
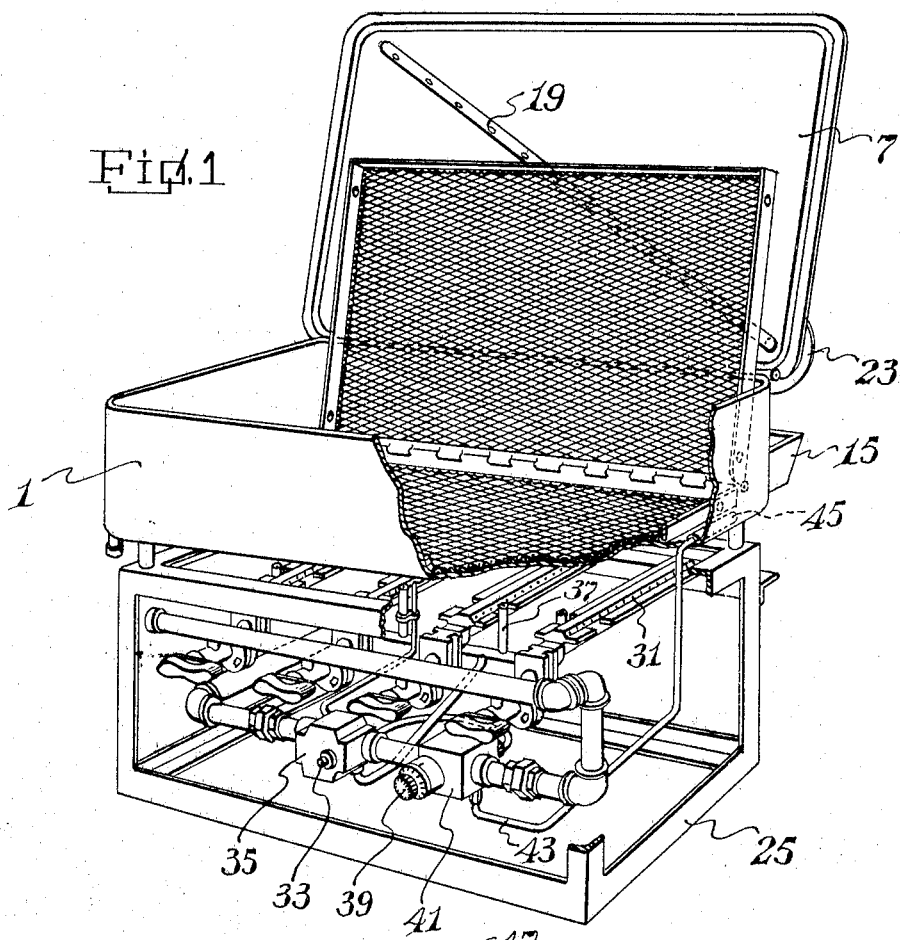
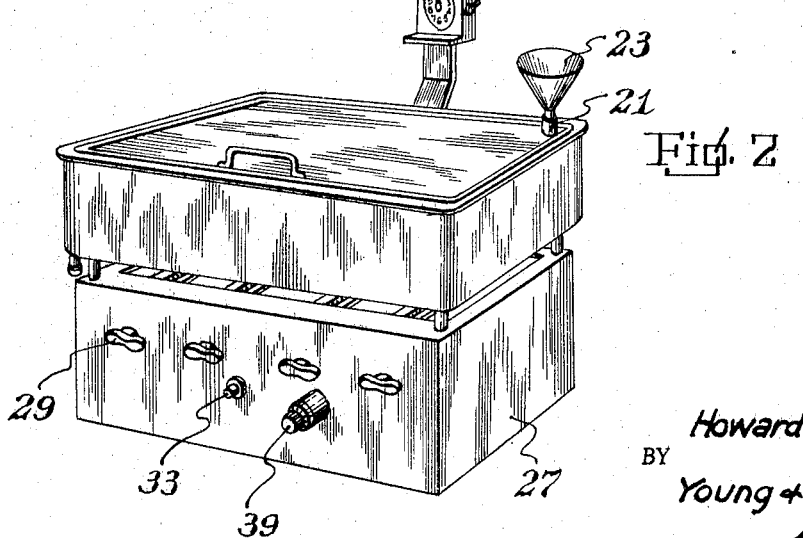
INVENTOR.
Howard E. Turrel
BY
Young & Thompson
ATTORNEYS Dec. 16, 1969     H. E. TURREL     3,483,815
FOOD FRYER
Filed May 13, 1968     2 Sheets-Sheet 2
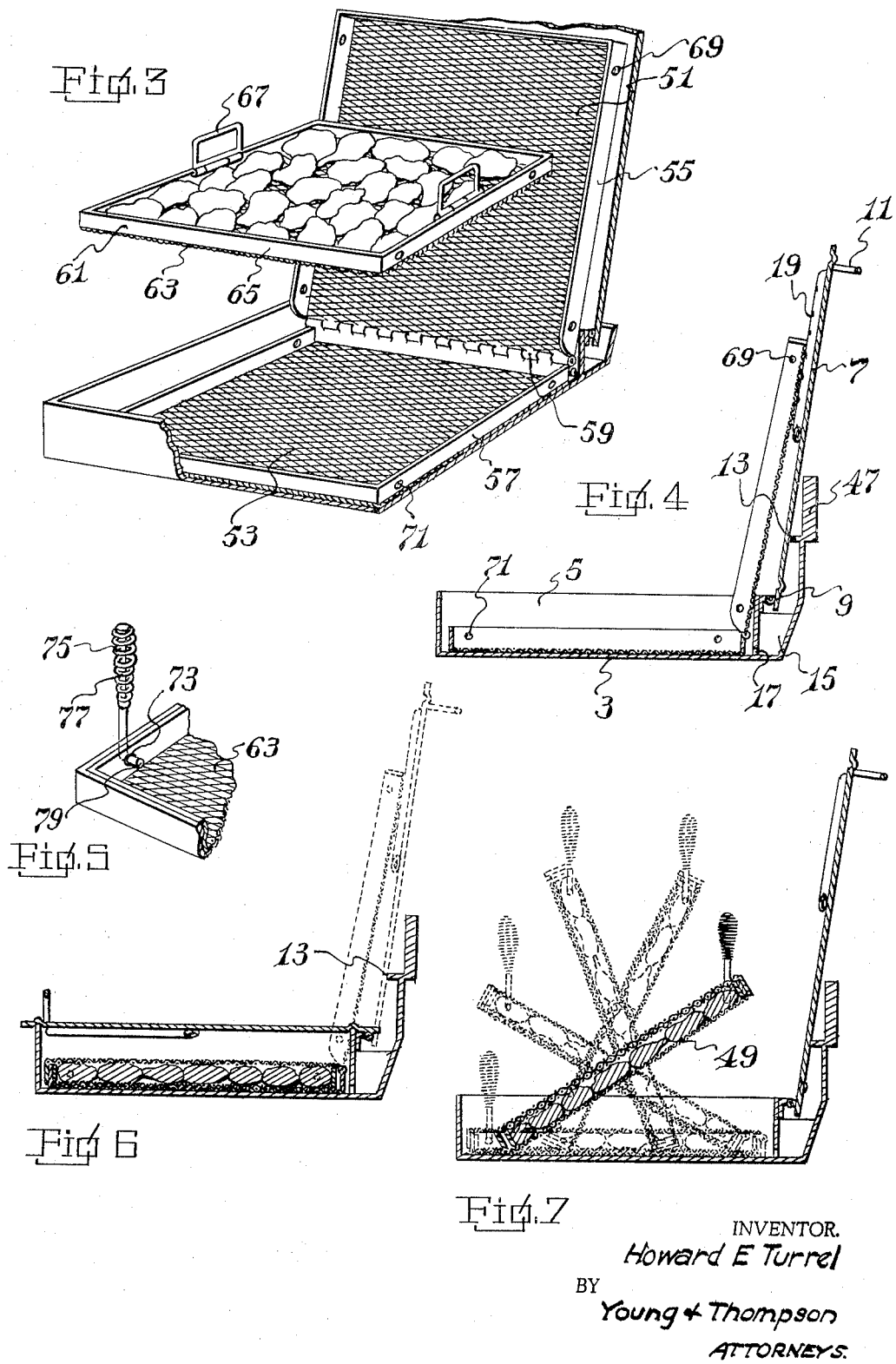
INVENTOR.
Howard E Turrel
BY Young & Thompson
ATTORNEYS.

United States Patent Office 3,483,815
Patented Dec. 16, 1969

3,483,815
FOOD FRYER
Howard E. Turrel, 103 E. 3rd St., Tulsa, Okla. 74103
Filed May 13, 1968, Ser. No. 728,564
Int. Cl. A47j *37/12*
U.S. Cl. 99—409
3 Claims

ABSTRACT OF THE DISCLOSURE

A food fryer comprises a pair of screens that are hinged together to form a flat foraminous container within which a screened tray of food to be fried is removably placed. When the hinged screens are closed together, holes through the sides of the hinged screens and the screened tray register with each other so that tools inserted in these holes can be used to lift and turn the container, without the parts becoming misaligned.

---

The present invention relates to food fryers, more particularly of the type in which foods such as chicken and shrimp and the like are deep fried in a hot liquid such as cooking oil. The invention has particular utility in commercial establishments for retail food sales, such as restaurants and carry-outs and the like; but it will be understood that the invention is also adaptable for use as a home food fryer.

It is an object of the present invention to provide a food fryer in which quantities of partially fried food may be readily handled or may be turned for frying first on one side and then on the other side.

Another object of the present invention is the provision of a food fryer in which the parts may be manipulated and transported from place to place or position to position without becoming misaligned.

Finally, it is an object of the present invention to provide a food fryer which will be relatively simple and inexpensive to manufacture, easy to assemble, install, operate, maintain and repair, and rugged and durable in use.

Other objects and advantages of the present invention will become apparent from a consideration of the following description, taken in connection with the accompanying drawings, in which:

FIGURE 1 is a perspective view, with parts broken away, of a food fryer according to the present invention in the open position.

FIGURE 2 is a perspective view of the food fryer of the present invention in the closed position it will ordinarily occupy when a frying operation is in progress;

FIGURE 3 is an exploded assembly view in perspective, with parts broken away, of the most important subcombinations of the present invention;

FIGURE 4 is a side-cross-sectional view of the structure shown in FIG. 3, but with the food tray removed;

FIGURE 5 is an enlarged fragmentary perspective view of a detail of the structure of the present invention, illustrating the relationship of some of the parts when they are to be manipulated;

FIGURE 6 is a view similar to FIG. 4 but with the food tray in place and the parts in the closed position; and FIGURE 7 is a view similar to FIG. 6 but with the parts in the open position, and illustrating various steps in the inversion of a screened food container so as to permit frying of the food first on one side and then on the other.

Referring now to the drawings in greater detail, there is shown a food fryer comprising a cooking vessel in the form of a shallow pan 1 having a flat bottom 3 and upright sides 5. The bottom and sides of pan 1 together comprise an upwardly open but otherwise fluidtight container.

Pan 1 is closed by a flat lid 7, mounted for vertical swinging movement on and about a hinge 9. Lid 7 may be raised and lowered by means of a handle 11; and in its raised position, lid 7 rests against a rear lid rest 13. Also in this raised position, lid 7 is disposed above a drip trough 15 so positioned that liquid draining from lid 7 in its raised position falls into trough 15. Drip trough 15 communicates with the rest of the interior of pan 1 through at least one opening 17, thereby to prevent the liquid level in drip trough 15 from rising too high and on occasion to drain the trough 15.

A perforated tube 19 is secured to and extends diagonally across the under side of lid 7 and communicates at one end with a fitting 21 on the upper side of lid 7 that detachably receives a funnel 23. Liquids such as wine or other flavorings, or additional cooking oil, can be introduced by means of funnel 23 when lid 7 is closed, these liquids then distributing themselves diagonally across the width of pan 1 through the opening of tube 19.

Pan 1 rests on a frame 25 which is enclosed by a casing 27. The various control members for the operation of the fryer are arranged on the front of the casing and comprise knobs 29 for the control of the burners 31 supplied with gas from a source of gas (not shown); a pilot reset button 33 for controlling the reset 35 for the pilot lights 37; and a thermostat knob 39 for setting the thermostat 41 that communicates through a conduit 43 with a thermostat bulb 45 in the bottom of pan 1, thereby to control the temperature by regulating the gas flow to the burners 31. Although not strictly speaking a control, a timer 47 is also provided which is carried by lid rest 13 and which may be merely manually operated and need not control automatically the frying operation.

Much of the structure described thus far is conventional. By contrast, the invention is more particularly characterized by the following structure:

Removably disposed in pan 1 is a screened container 49 comprised by two flat parallel screens 51 and 53 that are bordered by shallow side walls 55 and 57, respectively. A long piano hinge 59 pivotally interconnects screens 51 and 53 for swinging movement relative to each other between the positions of FIGS. 4 and 6, in the latter of which positions the side walls 55 of screen 51 outwardly overlie the side walls 57 of screen 53 in closely adjacent relationship, and in the latter of which positions screens 51 and 53 are parallel to each other and spaced apart a distance only sufficient to accommodate individual pieces of food between them. Thus container 49 is so shallow and flat as to leave virtually no room for pieces of food to move around in it once the container is closed.

Removably disposed within container 49 is a screened tray 61 whose bottom is a flat screen 63 and which has shallow upstanding side walls 65 of a height a little less than the height of side walls 55 and 57. Handles 67 are mounted for vertical swinging movement on opposite side walls 65 of tray 61; and in their raised position, the handles 67 provide a mean for carrying tray 61 and its contents. When tray 61 is disposed in container 49, however, the handles 67 swing down to the horizontal position and do not increase the vertical height of the tray 61.

Side walls 55 of screens 51 have holes 69 through opposite ends of those two side walls 55 which are opposite to each other and adjacent to the ends of hinge 59. Side walls 57 have holes 71 through opposite ends of the corresponding two side walls 57, the holes 69 and 71 registering with each other in the closed position of container 49. Tray 61 has holes 73 through opposite ends of those opposite side walls 65 on which handles 67 are mounted. When tray 61 is lowered into container 49 from the position of FIG. 3, holes 73 register with holes 69 and 71. An L-shaped tool 75 has handle 77 adapted to be held upright and a horizontally extending end 79 of a length and diameter adapted to enter and pass through holes 69, 71 and 73, in that order. Two tools 75 will ordinarily be used, one in each hand, for engagement with opposite sides of one end of the assembly shown in FIG. 7.

The operation of the present invention is as follows:

With cooking oil in pan 1 to a desired depth, container 49 is placed in pan 1 in the open position. When the cooking oil has reached the desired temperature, then chicken or shrimp or other food to be fried, which has been drenched and breaded, is placed one deep on tray 61, preferably with little or no room between the sides of the pieces. Tray 61 is then grasped by handles 67 and lowered onto the lower or horizontal screen 53 with the side walls 65 of tray 61 nesting within the side walls 57 of screen 53. The handles 67 are then folded down or fall by gravity, after which the raised screen 51 is closed over the food and the lid 7 is lowered, so that the parts occupy the position of FIG. 6. It is in this position that frying can proceed.

A very useful feature of the present invention enables the food to be partially fried all over, or alternatively, fried only on one side at a time. This in turn makes it possible, in a commercial establishment, to fry food partially, or to fry food on only one side, during slack periods, thereby to build up a stock of partially fried food. During busy periods, this partially fried food, that is, fried on only one side or only partially fried, can then be additionally fried for only a relatively short period, after which it can be served fresh and hot.

But it is necessary to lift out and store, and perhaps also to invert, the containers 49 with partially fried food in them, in order to take advantage of this feature of the invention. It is for this reason that the holes 69, 71 and 73 are provided: by using a pair of opposed tools 75 as shown in FIGS. 5 and 7, closed trays of partially fried food can be easily manipulated. For example, a tray 61 full of partially fried food can be lifted by either end and thus rotated in either direction through the positions of FIG. 7. Moreover, in order to lift out and store a tray of partially fried food or food fried only on one side, the container can easily be lifted and carried and laid down again by use of the same tools 75, despite the fact that the food in the container is hot and dripping hot oil.

It will especially be noted that the aligned holes 69, 71 and 73, when engaged by tools 75, maintain the tray 61 and the screens 51 and 53 of container 49 in their same relationship relative to each other. Container 49 cannot fly open and tray 61 cannot swing or shift relative to container 49. The container 49 and tray 61 and the partially fried food can thus easily be handled as a unit.

Needless to say, the level of cooking oil in pan 1 will be regulated according to whether it is desired to fry the food on only one side at a time, or whether it is desired completely to fry the food at one time by immersing it completely in the cooking oil.

To clean the unit, the cooking oil can readily be drained from pan 1 by means of a drain 81. The pan 1 and container 49 and tray 61 are readily removable from each other for easy cleaning.

From a consideration of the foregoing disclosure, therefore, it will be evident that all of the initially recited objects of the present invention have been achieved.

Having described my invention, I claim:

1. A food fryer comprising a pair of flat screens, hinge means interconnecting the flat screens for swinging movement relative to each other, shallow side walls bordering said screens and so disposed that when the screens are swung together these side walls are in side-by-side relation and space the screens apart in parallel relation thereby to form a flat shallow container for food to be fried, and openings through said side walls of both said screens, said openings registering with each other in the closed position of said screens thereby to permit manipulation of said screens as a unit by insertion of a tool through said openings while at the same time maintaining the screens closed.

2. A food fryer comprising a pair of flat screens, hinge means interconnecting the flat screens for swinging movement relative to each other, shallow side walls bordering said screens and so disposed that when the screens are swung together these side walls space the screens apart in parallel relation thereby to form a flat shallow container for food to be fried, and a shallow screened tray removably disposed between said screens for positioning food between said screens.

3. A food fryer as claimed in claim 2, and handles swingably mounted on opposite sides of said tray.

References Cited

UNITED STATES PATENTS

| | | | |
|---|---|---|---|
| 616,420 | 12/1898 | Korbel | 99—409 |
| 629,127 | 7/1899 | Geer | 99—409 |
| 1,047,608 | 12/1912 | Berthold | 99—409 |
| 2,066,749 | 1/1937 | Trank | 99—409 |
| 2,367,448 | 1/1945 | Thiele | 99—409 |

ROBERT W. JENKINS, Primary Examiner